United States Patent [19]

Butz

[11] Patent Number: 4,490,764
[45] Date of Patent: Dec. 25, 1984

[54] DISC PACK ASSEMBLY

[75] Inventor: David E. Butz, Littleton, Mass.

[73] Assignee: Data Packaging Corporation, Cambridge, Mass.

[21] Appl. No.: 376,685

[22] Filed: May 10, 1982

[51] Int. Cl.³ .............................................. G11B 23/02
[52] U.S. Cl. .................................................... 360/133
[58] Field of Search ......................... 360/133; 206/444

[56] References Cited

U.S. PATENT DOCUMENTS 4,084,200  4/1978  Adair et al. ......................... 360/133
4,194,228  3/1980  Duff .................................... 360/133

Primary Examiner—Robert S. Tupper
Attorney, Agent, or Firm—Wolf, Greenfield & Sacks

[57] ABSTRACT

A disc pack assembly having a top cover and a bottom cover which together define a housing that contains the magnetic disc and hub assembly. An opening in the bottom cover is closed by a removable cover. The opening in the bottom cover provides access for the drive spindle which engages and rotatably supports the disc and hub assembly when the pack without the removable cover is mounted on a computer. The magnetic memory disc and hub assembly is afforded limited axial and radial movement within the housing when the removable cover is removed, but the removable cover includes a retaining ring which both supports and fixes the disc and hub assembly in the housing by engaging the hub through the opening when the removable cover is in place on the pack.

8 Claims, 9 Drawing Figures

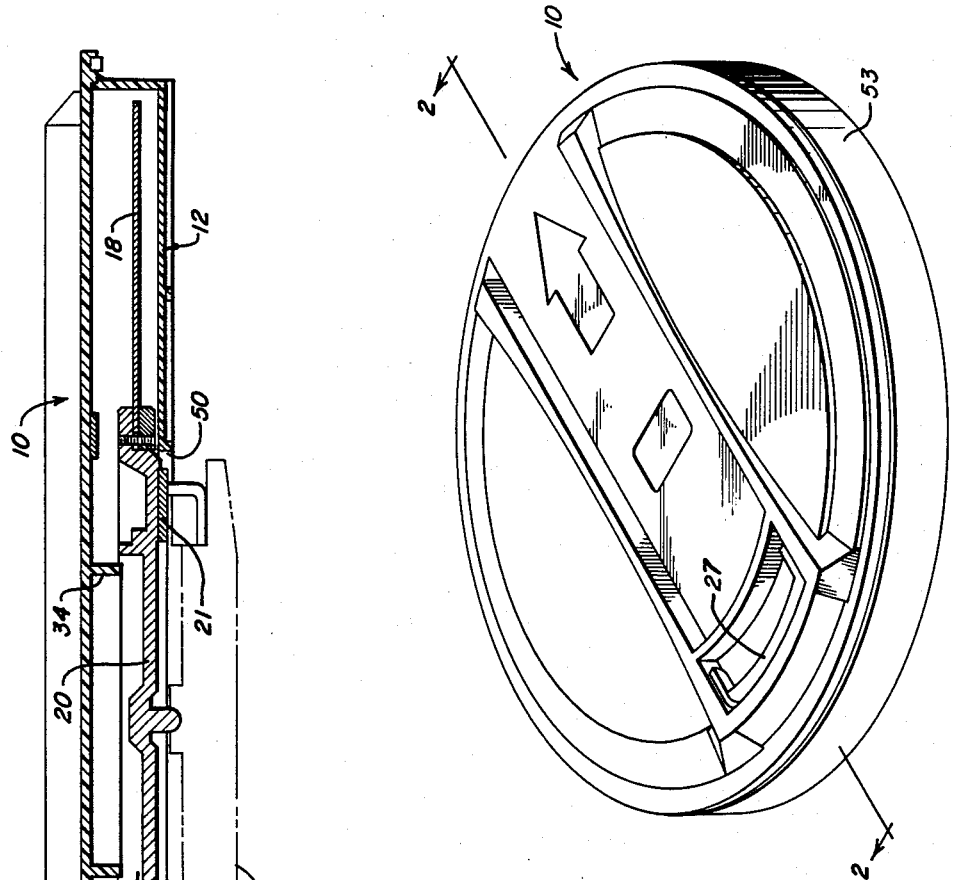
FIG. 1
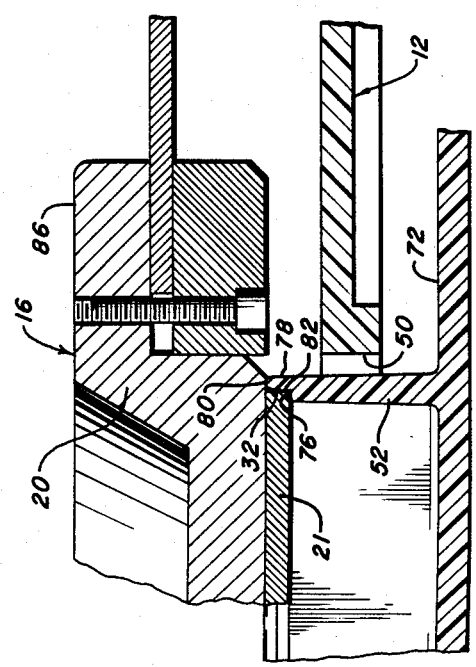
FIG. 4
FIG. 5

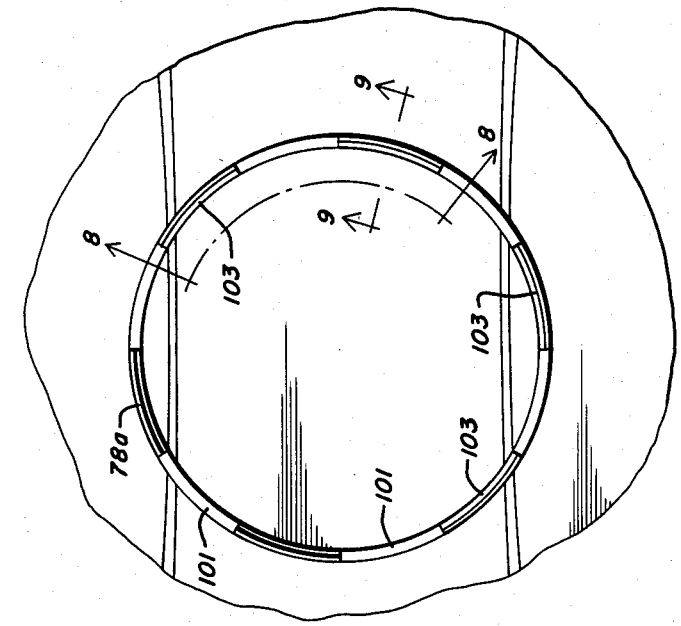
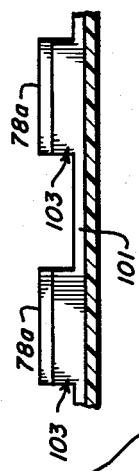
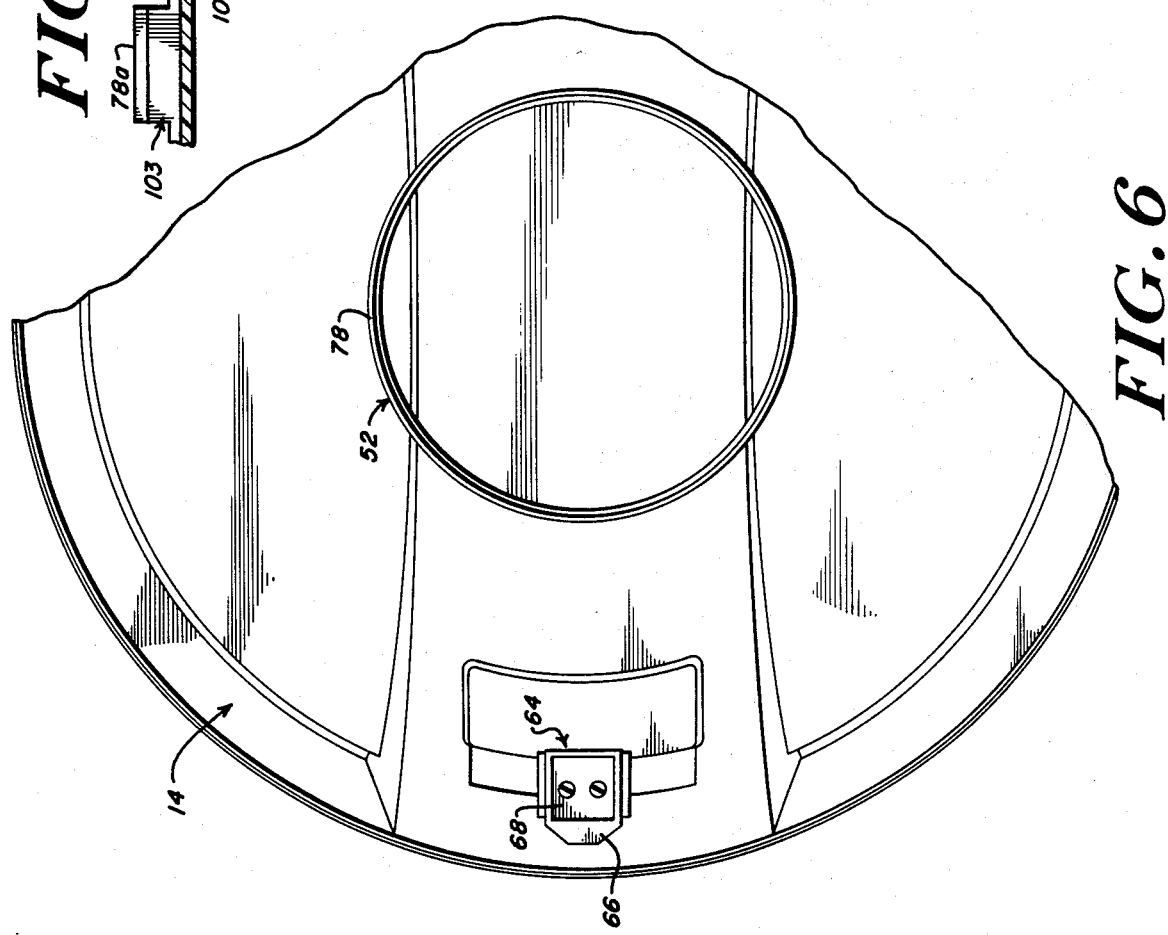

DISC PACK ASSEMBLY

BACKGROUND OF THE INVENTION

This invention relates to magnetic disc memory devices used with computers and more particularly comprises a new and improved disc pack assembly containing a single magnetic disc.

The disc pack assembly into which the present invention is incorporated is of a commonly used variety which contains a single magnetic memory disc. The disc pack assembly includes a top cover and bottom cover which together form a housing within which is mounted the single memory disc. The disc is connected to a hub, and the combination disc and hub together are permitted limited axial and radial movement within the housing. When the assembly including the bottom and top covers with the memory disc and hub are mounted on the computer with which it is used (the hub carries an armature plate which connects to the spindle drive), the hub and disc are floated in the housing so that they do not contact either of the covers, and the disc and hub can rotate freely with the drive spindle of the computer. Access to the hub by the spindle is provided through a central opening in the bottom cover, and that opening is closed by a removable cover which forms a sealed container with the top cover when mounted in place on the pack.

In accordance with prior art devices, resilient pads are incorporated into the removable cover, which extend through the opening in the bottom cover when the pack is fully assembled and engage the armature so as to hold the disc and hub in a fixed position in the housing. That arrangement, however, has proved to be not entirely satisfactory, because while the pads provide sufficient axially directed forces to prevent the disc and hub from moving axially in the housing, the pressure applied by the pads is not always sufficient to prevent lateral motion, because the resistence to lateral motion is imposed only by the frictional engagement of the pads with the armature.

In this class of disc packs, the removable cover is latched to the top cover at two diametrically opposed points, and the peripheral walls of the top and removable covers are intended to engage one another and form a seal about the entire periphery of the assembly. When the bottom cover is dimensioned so that sufficient forces are applied to prevent the lateral shifting of the disc and hub assembly in the housing, the edges of the top cover and removable cover at points intermediate the latches bow away from each other so as to open the dust seal intended to be formed at the pack periphery. The dust seal is very important to prevent contamination of the magnetic surfaces on the disc, and therefore the amount of force that can be applied to resist lateral shifting is limited if the seal is to be preserved. Thus, efforts to maximize the effectiveness of the seal and to prevent lateral displacement of the disc and hub assembly work against one another.

The resilient pads have yet another disadvantage. When the pack is clamped tightly enough so as to resist lateral shifting of the disc, the pads tend to stick to the armature, and particles of the pad are torn away when the disc moves. The particles may stick to the metal surface of the disc and adversely affect the disc performance. Various ingredients in the pads may also attack and corrode the plated metal surface. And the glue used to mount the pads is another potential source of unwanted debris.

In U.S. Pat. No. 4,194,228, a disc pack is shown which embodies a ring mounted on the top cover, to counteract some of the deficiencies of the resilient pads. The ring is not used in place of the pads, but rather is provided as a supplement to them. Because the ring is part of the top cover, it must necessarily have some clearance with the hub to allow the disc to rotate freely when mounted on the computer. Therefore, it cannot totally eliminate disc shifting. While the ring of the U.S. Pat. No. 4,194,228 may prevent the edges of the disc from crashing against the container walls, the shifting which it does permit is sufficient to allow particles to be generated due to friction within the housing. Furthermore, when the pack is subjected to large shocks to cause the disc and hub assembly to shift in the pack, albeit limited by the ring, the hub may shift slightly with respect to the disc because the disc is merely clamped to the hub and not immovably tied to it. If concentricity between the hub and disc is lost, obviously the memory disc is unusable.

SUMMARY OF THE INVENTION

In accordance with the present invention, the limitations of the prior art are overcome by providing a ring, either continuous or interrupted, on the removable cover, which ring is dimensioned to firmly engage the hub assembly which includes the armature and prevent all motion of the disc and hub assembly relative to the pack when the removable cover is in place. While in the prior art devices lateral shifting of the disc in the housing is limited, in accordance with this invention, shifting is prohibited.

In accordance with the teachings of U.S. Pat. No. 4,194,228, the dimensions of the retaining ring are critical because some minimum clearance must be provided between the ring and hub so as to permit the disc to rotate freely with the drive spindle when the disc pack is in use. Those critical dimensional requirements are eliminated in accordance with the present invention because the ring is provided on the removable cover and accordingly plays no part in the device when the disc pack is in use.

This invention will be better understood and appreciated from the following detailed description of several embodiments thereof, read in connection with the accompanying drawings.

BRIEF FIGURE DESCRIPTION

FIG. 1 is a perspective view of a disc pack embodying this invention;

FIG. 4 is a cross sectional view of the disc pack of this invention taken along the same plane as FIG. 2 but showing the disc pack without the removable cover and suggesting the manner in which it is mounted on a drive spindle;

FIG. 5 is an enlarged fragmentary cross sectional view showing a detail of the retaining ring and hub assembly;

FIG. 6 is a plan view of the inside of the removable cover of this invention;

FIG. 7 is a plan view of the retaining ring constructed in accordance with another embodiment of this invention; and FIGS. 8 and 9 are fragmentary cross sectional views taken along section lines 8—8 and 9—9 of FIG. 7.

DETAILED DESCRIPTION

Figure 2:
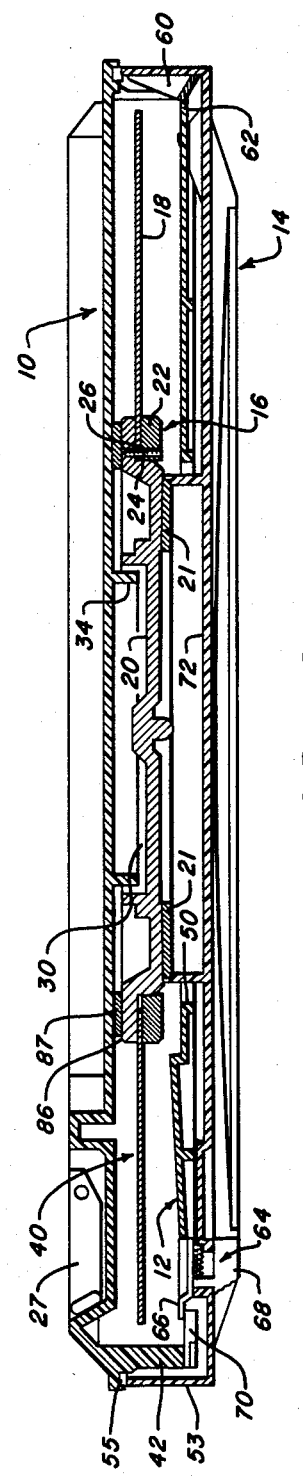
FIG. 2 is a cross sectional view of the disc pack taken across the pack diameter along section line 2—2 of FIG. 1.

The disc pack shown in FIGS. 1 and 2 is composed of four major parts, namely top cover 10, bottom cover 12, removable cover 14 and memory disc and hub assembly 16. The disc and hub assembly includes the memory disc 18, a hub 20, armature plate 21 and clamping ring 22. The hub and ring are secured together by screws 24 and clamp over the inner edge 26 of the disc. The armature plate is also screwed to the hub, but those screws are omitted for clarity in the drawings. The pack is designed to be carried by the bail shaped handle 27.

The disc and hub assembly 16 is of generally conventional design and includes a well 30 formed in the upper surface of the hub and a step or shoulder 32 on the hub lower surface (see FIG. 5). The step 32 is defined by the edges of the armature plate 21 and the hub 20. A ring 34 formed as an integral part of top cover 10 has a diameter slightly smaller than the internal diameter of the well 30 and extends into the well so as to limit the extent of the translational movement permitted the disc assembly relative to the top and bottom covers when the removable cover is removed. The ring 34 need not and preferably is not as closely dimensioned with respect to the hub well as is the ring in the cover of U.S. Pat. No. 4,194,228 but rather acts merely as a rough guide in centering the disc and hub assembly for mounting on the drive spindle.

The top cover 10 and bottom cover 12 form a permanent housing 40 for the disc and hub assembly 16. The covers 10 and 12 are secured together about the bottom cover periphery which registers with the skirt 42 of the top cover. It is evident that when the disc assembly 16 is confined within the housing 40 defined by the top and bottom covers and the removable cover 14 is removed, the disc assembly is afforded limited translational and radial movement within the housing so that it may essentially float in the housing when supported on the spindle and rotate freely relative to the top and bottom covers. As is suggested in FIG. 4, the armature plate 21 of the hub assembly is magnetically coupled to the spindle drive 44 of the computer by means of the magnets 46 when the disc pack is in use, and in that position, the disc assembly is free of all contact with the housing defined by the top and bottom covers. Access is provided to the disc 18 by means of openings in the housing periphery.

The bottom cover 12 is provided with a central opening 50 whose diameter is somewhat greater than the diameter of the hub measured at the shoulder 32. Opening 50 provides access to the hub assembly when the disc pack is mounted on the computer in the fashion shown in FIG. 4. The opening also provides access to the hub by the disc assembly retainer 52 formed as an integral part of the removable cover 14 and which engages the shoulder 32 to firmly support the disc assembly when the removable cover is in place.

Removable cover 14 has a peripheral skirt 53 which engages the gasket 55 carried on top cover 10 radially beyond top cover flange 42. This contact between top and bottom covers forms a seal for the housing 40 when the pack is closed. The removable cover is secured to the housing 40 defined by the permanently connected top and bottom covers by a two point connection as shown in FIG. 2. On the right side as viewed in that figure, the removable cover is retained in place by means of its flange 60 which overlies the edge 62 provided in the bottom cover. On the left side, the removable cover carries a latch 64 which includes a movable tongue 66 carried on finger actuated slide 68. The tongue overlies a shoulder 70 in the bottom cover to retain the removable cover in place. In FIG. 2 the top and removable covers are shown in the latched position. To remove the bottom cover, the operator need only move the slide 68 to the right which will unseat the tongue 66 from the shoulder 70 on the bottom cover. With the latch uncoupled, the left side of the cover may be dropped and then moved laterally so as to disconnect the flange 60 from the edge 62 on the opposite side of the case.

Figure 3:
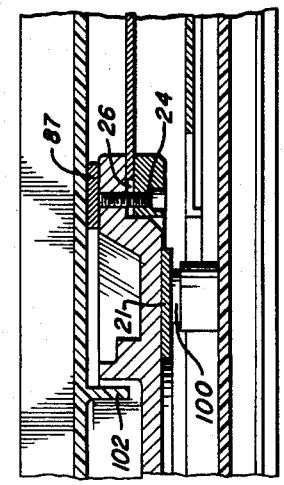
FIG. 3 is a fragmentary cross sectional view of a disc pack constructed in accordance with the prior art.

In accordance with one embodiment of this invention, retainer 52 is in the form of a continuous ring concentric with the top and bottom covers and molded as an integral part of the removable cover on its upper surface 72. The retainer ring 52 is provided with a seat 76 and an upstanding flange 78 which engage the shoulder 32 formed by the lower surface 80 of the hub 20 and side 82 of armature plate 21. (See FIG. 5). The retainer ring 52 is dimensioned so that when the removable cover 14 is in place, the seat 76 supports the hub at an elevation causing the upper surface 86 of the hub to engage the pad 87 on the top cover 10. The pad 87 may be a ring or a pair of rectangular plates attached to or formed as an integral part of the top cover. That contact is just sufficient to prevent any axial motion of the disc assembly in the housing when the removable cover is in place. The inner diameter of flange 78 of retainer 52 may just exceed the outer diameter of the armature 21 of the hub assembly measured to surface 82, so as to prohibit any lateral displacement of the disc assembly when the removable cover is in place. Thus, the retainer 52 serves both to support the disc assembly in the manner of the resilient pads 100 shown in the prior art of FIG. 3 but in addition totally prevents lateral displacement of the disc assembly, which is not achieved either by the resilient pad 100 or the ring 102 of the top cover on the prior art.

It will be apparent that the retainer 52 can take many different forms. Thus, while in FIGS. 5 and 6 the retainer is in the form of a continuous ring, and very slight clearance is provided between the flange 78 and the surface 82 of the hub assembly, the retainer can provide a clamp fit with the hub. This may be achieved by providing an interference fit between the surface 82 and the inner surface of the flange 78. Alternatively, as suggested in FIG. 7, the retainer may be interrupted so as to form fingers 103 with some added flexibility in the flange area 78a which will engage the hub shoulder about spaced areas of the hub periphery. By interrupting the retainer ring in this fashion, the fingers 103 are provided with increased flexibility so that a tighter grip may be imposed on the hub assembly. It will be appreciated that even when slight clearance is provided, the continuous long contacting surfaces of the retainer ring and hub assembly of the closely adjacent walls prevents any shifting of the disc and hub assembly. For purposes of strength, moldability and esthetics, the gaps between adjacent fingers may be bridged by short walls 101, as shown in FIGS. 7 and 8.

The present invention eliminates the need for the pads 100 shown in the prior art. The criticality of the dimensional tolerances is reduced because disc assembly retention is not dependent upon the frictional contact between the retainer ring and the hub, but rather the retainer provides both axial and radial support for the hub. The absence of pads 100 found in the prior art reduces the chance of particle generation, and the adverse effect on the peripheral seal of the closed pack is eliminated. It is unnecessary to impose the very substantial pressures on the parts which produce bowing of the covers as in the prior art devices. Furthermore, the total elimination of any shifting of the disc assembly in the pack prevents particle generation and possible misalignment of the hub with respect to the disc itself.

It will be apparent from the foregoing description that numerous modifications may be made of this invention without departing from its spirit. Therefore, it is not intended to limit the breadth of this invention to the embodiments illustrated and described. Rather, it is intended that the scope of this invention be determined by the appended claims and their equivalents.

What is claimed:

1. A disc pack comprising:
   a top cover and a bottom cover permanently secured together,
   a hub assembly,
   a magnetic memory disc attached to the hub assembly,
   a detachable cover for closing said opening,
   means on the top cover coacting with said hub assembly to limit axial and radial movements of the disc between the covers when the detachable cover is removed from the pack,
   a circular opening in the center of the bottom cover exposing the bottom of the hub assembly,
   an annular shoulder formed in the bottom of the hub assembly and having a smaller diameter than the opening in the bottom cover so that it is exposed through said opening,
   and a cylindrical wall permanently fixed to the detachable cover and of a height sufficient to extend through the opening in the bottom cover and to engage the bottom and sides of the annular shoulder so as to hold the disc in place and clamped against the top cover to prevent axial and lateral movement of the disc relative to the top and bottom covers.

2. In a disc pack assembly having a top cover and bottom cover defining a housing, a memory disc and hub assembly mounted for rotational movement between said covers, an opening in the bottom cover through which the hub assembly may be engaged by a spindle drive so as to be rotated in said housing, and a detachable cover for closing said opening;
   the improvement comprising means mounted on the detachable cover adapted to engage the bottom and sides of the hub assembly through the opening in the bottom cover when the detachable cover is in place on the pack to hold the disc in place and clamped against the top cover to prevent it from moving axially and laterally in the housing.

3. In a disc pack assembly as defined in claim 2, said hub assembly having an annular shoulder and said means comprising a cylindrical wall formed as an integral part of the detachable cover and engaging the bottom and sides of the shoulder of the hub assembly.

4. In a disc pack assembly as defined in claim 2, said hub assembly having a peripheral wall exposed through said opening, and said means including a circular seal on the inner surface of the detachable cover engaging the peripheral wall to prevent it from shifting radially in the housing.

5. In a disc pack assembly as defined in claim 4, said means includes a shoulder engaging the edge of the peripheral wall and a flange engaging the side of the peripheral wall for preventing movement of the disc and hub assembly in the housing when the detachable cover is in place.

6. In a disc pack assembly as defined in claim 5, said seat being interrupted about its circular extent.

7. In a disc pack assembly as defined in claim 5, said flange having a snug fit against the side of the peripheral wall.

8. In a disc pack assembly as defined in claim 6, said flange having a snug fit against the side of the peripheral wall.

* * * * *